United States Patent [19]  [11] Patent Number: 5,030,809
Buday  [45] Date of Patent: Jul. 9, 1991

[54] VERTICAL OVEN

[76] Inventor: Gene Buday, 23902 Taranto Bay, Laguna Niguel, Calif. 92677

[21] Appl. No.: 480,817

[22] Filed: Feb. 16, 1990

[51] Int. Cl.$^5$ ............................................ F27D 11/06
[52] U.S. Cl. .................................... 219/388; 219/400; 126/21 A; 99/323.9; 99/386; 99/404; 99/420; 198/465.3
[58] Field of Search ............ 219/388, 400; 126/21 A, 126/41 A; 99/420, 404, 323.9, 386; 198/465.3

[56] References Cited

U.S. PATENT DOCUMENTS

| | | | |
|---|---|---|---|
| 1,633,236 | 9/1923 | Troiel | 198/465.3 |
| 1,837,605 | 12/1931 | Baker | 198/465.3 |
| 1,894,688 | 1/1933 | Icre | 198/465.3 |
| 3,127,499 | 3/1964 | Savio | 219/400 |
| 3,312,811 | 4/1967 | Shanklin | 219/388 |
| 3,502,020 | 3/1970 | Bressickello | 219/388 |
| 3,779,361 | 12/1973 | Schmitt | 198/24 |
| 3,847,069 | 11/1974 | Guibert | 99/443 R |
| 3,884,213 | 5/1975 | Smith | 126/21 A |
| 3,993,189 | 11/1976 | Khoylian et al. | 198/469 |
| 4,034,661 | 7/1977 | Boosalis et al. | 99/339 |
| 4,072,093 | 2/1978 | Zimmer et al. | 99/443 R |
| 4,154,861 | 5/1979 | Smith | 426/466 |
| 4,164,391 | 8/1979 | Howard et al. | 432/124 |
| 4,191,881 | 3/1980 | Ahlgren et al. | 219/388 |
| 4,262,586 | 4/1981 | Miller et al. | 99/345 |
| 4,508,025 | 4/1985 | Schultz | 99/353 |
| 4,644,136 | 2/1987 | Watchman | 219/400 |
| 4,751,876 | 6/1988 | Escamilla | 99/353 |
| 4,767,639 | 8/1988 | Orii | 426/523 |

OTHER PUBLICATIONS

"You've Already Got What It Takes", Advertisement of 5 pages.
"CTX GEMINI", Catalog of 12 pages.
"CTX Conveyorized Cooking Systems", Price List of 5 pages.
"Lincoln Impinger Ovens", Cooking Chart of 3 pages.
"Bunting Permanent Magnetic Conveyer Components", Catalog of 12 pages.
"Verticon Oven", Advertisement of 1 page.

Primary Examiner—Bruce A. Reynolds
Assistant Examiner—Tuan Vinh To
Attorney, Agent, or Firm—Stetina and Brunda

[57] ABSTRACT

A conveyorized oven is disclosed for heating products as they traverse vertically within the oven. The oven comprises an oven housing, duct assembly and a conveyor assembly. The oven housing has a first open end for receiving the duct assembly and conveyor assembly. The duct assembly operates to distribute heat generated by one or more heater elements disposed within the housing. The conveyor assembly comprises a pair of synchronized conveyor mechanisms having opposing surfaces which descend in the oven. Rigid support members are formed on the first and second conveyor mechanisms to receive and support products within the oven. As the products reach the lowermost portion of the oven they are released from the conveyor mechanisms and discharged from the oven.

23 Claims, 4 Drawing Sheets

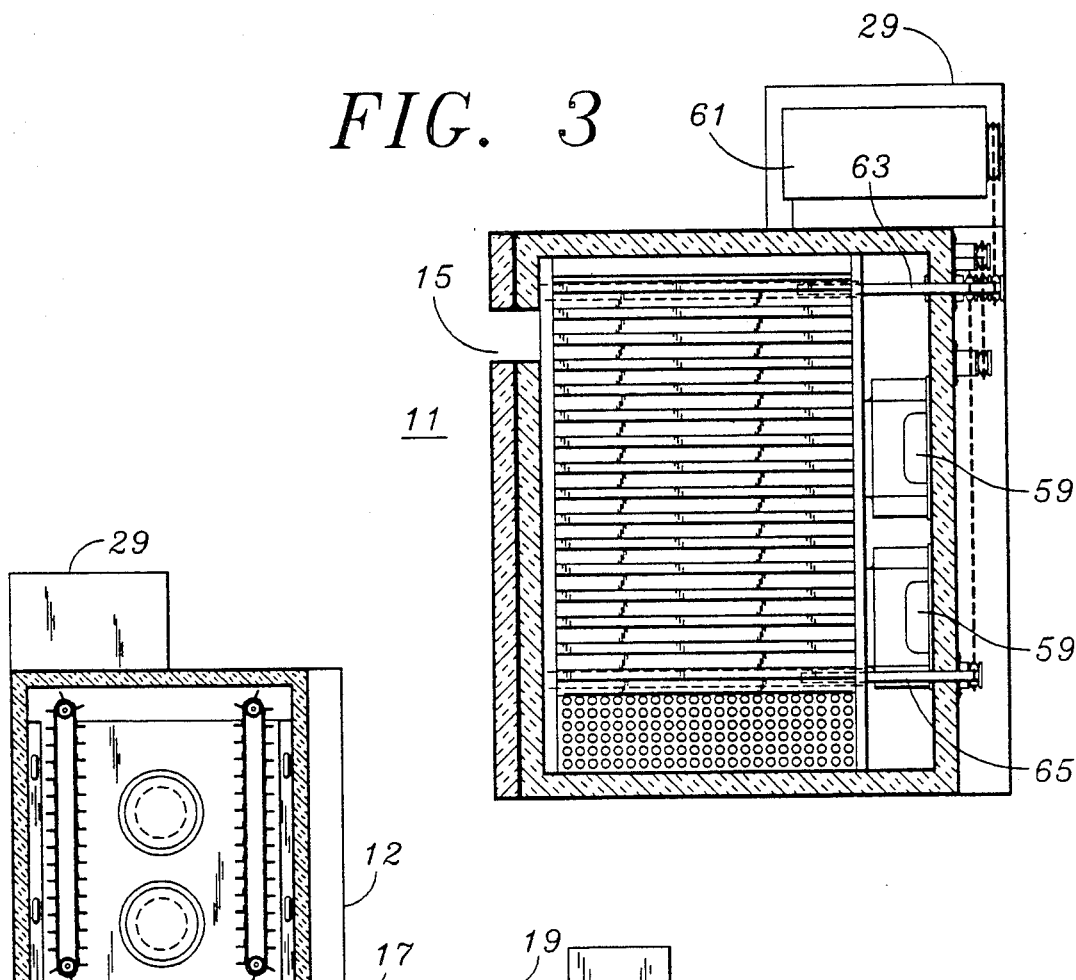
FIG. 3
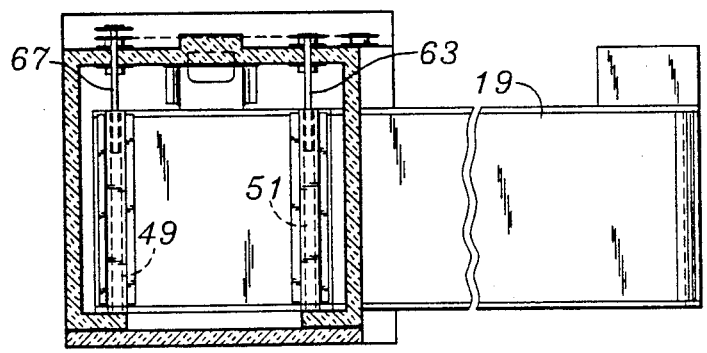
FIG. 4
FIG. 5

VERTICAL OVEN

BACKGROUND OF THE INVENTION

The present invention relates to ovens and, more particularly, to conveyorized ovens for transporting products in a vertical direction.

Commercial ovens are designed and constructed with a number of frequently competing goals in mind. First and foremost, the oven must perform the broiling, baking or toasting functions in a proper manner, and on a predictably repeatable basis. Secondly, the oven should be able to satisfy production requirements in an efficient, user friendly manner, without undo space, power or labor requirements. Additionally, in view of applicable health and safety codes, the oven should be constructed so that it can be thoroughly and easily cleaned to insure the healthfulness of products cooked in the oven.

A variety of conveyorized ovens are presently available for commercial use. A substantial number of such ovens utilize a horizontal conveyor system which passes the products to be cooked through a heating chamber. Though such horizontal conveyor systems are generally adequate to perform their cooking functions they suffer in relation to the other requirements discussed above. The footprint, or floor space required to store such ovens may well be too large to permit their usage in many locations. Production capacity also suffers in view of the inherent limitations on the spacing of products passing through the oven. Each product must be spaced by the length, width or diameter of each product. The attached conveyor systems consume further floor space and expense. Moreover, unless the conveyor system is substantially integral with the oven there may be substantial heat loss between the conveyor system and the oven.

Spiral-type ovens have more limited floor space requirements than horizontal conveyor ovens. However, production capacity is again limited by end-to-end sizing of the products. Moreover, spiral-type ovens incorporate support and drive structures within the central heating area of the oven. Such a construction produces a number of disadvantages, such as those associated with oven maintenance and the uniformity of heat flow through the oven.

Prior to the present invention no vertically conveyorized ovens have satisfactorily addressed the previously mentioned deficiencies of the prior art. The present invention provides a mechanism for reliable and efficient baking of various products with minimum floor space requirements. The mechanism disclosed herein incorporates a modular type construction wherein the oven housing, conveyor drive and baffle structure may be readily disassembled from each other to facilitate ease of cleaning and maintenance. The conveyor drive assembly is constructed and disposed in a manner to provide minimum interference in the heat flow through the oven and thereby facilitate the even distribution of heat across the products service in the most efficient and reliable manner.

These and other objects and advantages of the present invention are described below in connection with the presently preferred embodiment illustrated in the drawings.

SUMMARY OF THE INVENTION

A conveyorized oven is disclosed for heating products as they traverse vertically within the oven. The oven comprises an oven housing, duct assembly and a conveyor assembly. The oven housing has a first open end for receiving the duct assembly and conveyor assembly. The duct assembly operates to distribute heat generated by one or more heater elements disposed within the housing. The conveyor assembly comprises a pair of synchronized conveyor mechanisms having opposing surfaces which descend in the oven. Rigid support members are formed on the first and second conveyor mechanisms to receive and support products within the oven. As the products reach the lowermost portion of the oven they are released from the conveyor mechanisms and discharged from the oven. The oven further comprises at least one heater element and one heat circulation fan disposed within the oven for heating and circulating air within the oven housing.

The conveyor assembly drive mechanism is disposed external to the housing and is substantially thermally isolated from temperature conditions within the oven. Connecting members extend intermediate the conveyor assembly drive mechanism and the conveyor mechanisms and represent the only moving component that is not removed from the oven interior when the conveyor assembly is withdrawn from the oven.

The conveyor mechanisms may be spaced such that they receive and support a plurality of serrated trays upon which the products to be heated may be placed. As the conveyor mechanisms rotate the trays move downwardly within the oven until they reach the lowermost traveling point of the conveyor mechanisms and are either discharged from the oven or dropped onto a horizontal conveyor which transports them out of the oven.

Control means are provided to regulate functions such as the fan speed, heating and conveyor speed to accommodate heating requirements of a wide variety of products.

BRIEF DESCRIPTION OF THE DRAWINGS

FIG. 3 is a side view of the embodiment shown in FIG. 1;

FIG. 4 is a front view of the embodiment shown at FIG. 1, as connected to a horizontal transfer conveyor;

FIG. 5 is a top view of the embodiment shown in FIG. 4;

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps of constructing and operating the invention in connection with the illustrated embodiments. It is understood, however, that the same or equivalent functions and sequences may be accomplished by different embodiments that are also intended to be encompassed within the spirit and scope of the invention.

Figure 1:
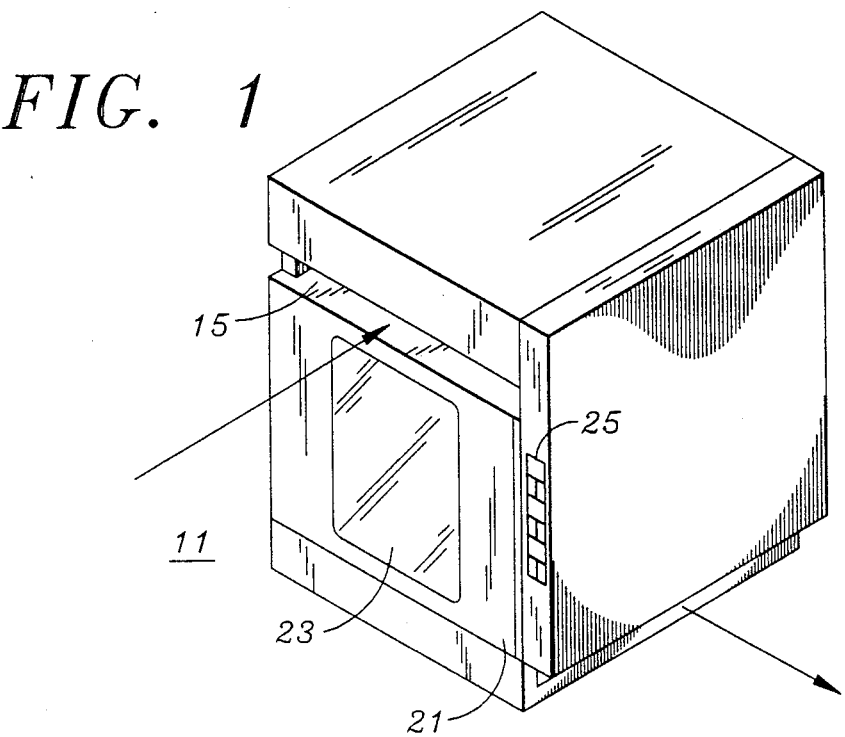
FIG. 1 is a front perspective view of the presently preferred embodiment of the invention.

FIG. 1 is a front perspective view of the presently preferred embodiment of the invention. As shown therein the oven 11 comprises a housing 13 having a loading slot 15 for receiving products to be baked. In the presently preferred embodiment the products descend within the oven and are discharged at the lower portion of the oven. However, it is to be understood that the oven may alternatively operate to transport products upwardly within the oven without departing from the broader aspects of the present invention.

In the presently preferred embodiment the products are discharged onto a conveyor belt 19 which extends into the oven 11 through a discharge slot 17. It should be understood, however, that the use of a horizontal conveyor is optional and that products may be discharged from the oven by sliding along an inclined surface extending into the lower portion of the oven 11.

The embodiment shown at FIG. 1 also includes a removable front panel 21 which insulates the interior of the oven 11 in normal operation. The front panel 21 may also include window 23 to permit viewing of products being heated within the oven 11. The panel 21 may be removed to facilitate cleaning the components within oven 11, as described in more detail below.

Control panel 25 is operative to regulate the various functions affected within oven 11. Individual controls regulate functions such as temperature, fan speed and the rate at which products pass through the oven 11. By regulating those functions the throughput rate of oven 11 can be maximized for various types of products. It should be understood that various types of control systems may be implemented without departing from the broader aspects of the invention. For example, the oven 11 can be formed to have regions that perform different heating functions, e.g. broiling and baking, and the speed control may vary the rate at which the products pass through those different regions. More detailed information regarding the construction of the various components controlled by control panel 25 is set forth below.

Figure 2:
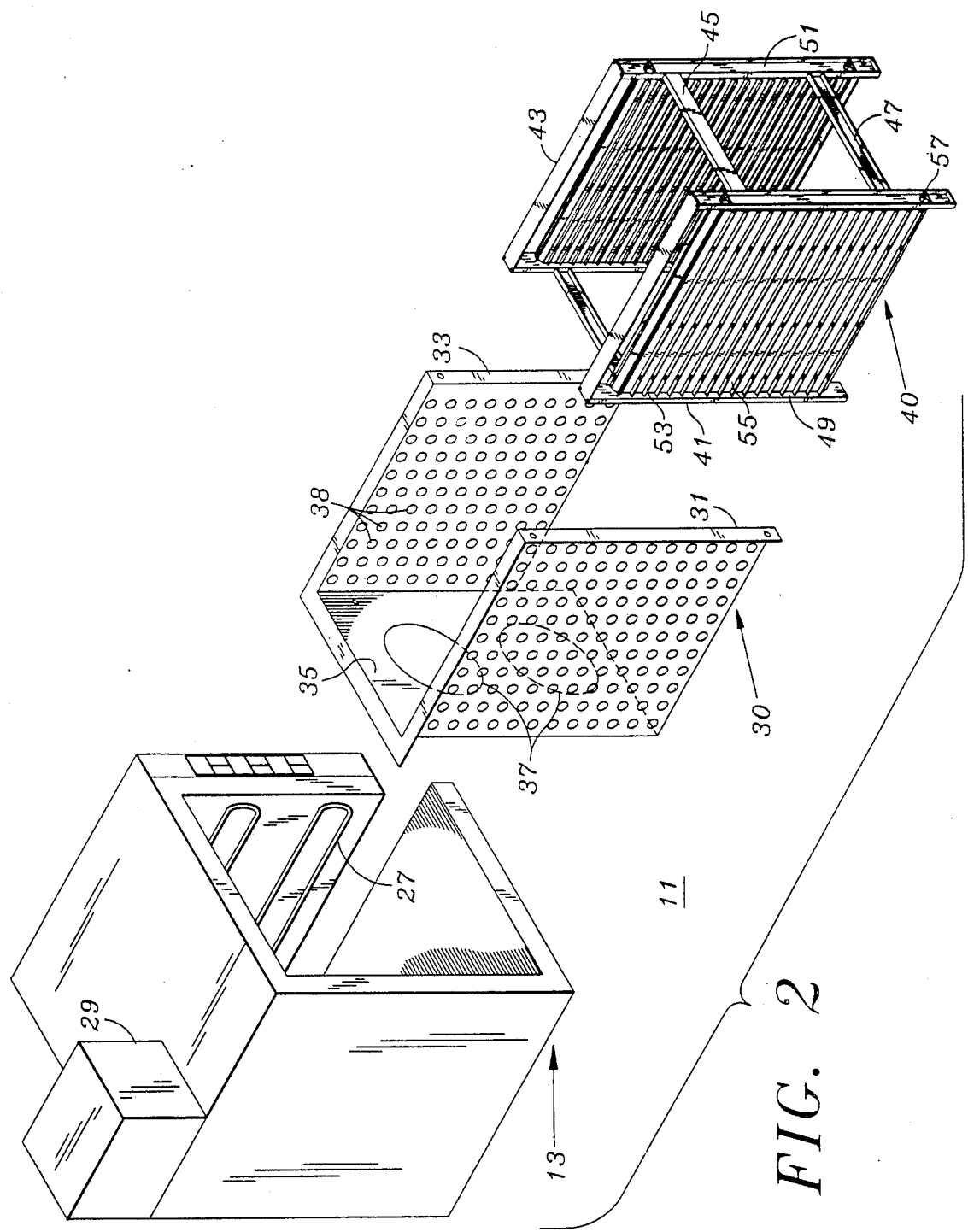
FIG. 2 is an exploded view of the embodiment shown in FIG. 4.

FIG. 2 is an exploded view of the interior of oven 11. The principal components shown in FIG. 2 are the exterior housing 13, the duct assembly 30 and the conveyor assembly 40. The oven 11 is constructed such that, upon removal of front panel 15, the conveyor assembly 40 may be readily removed from the interior of oven 11. Thereafter, the duct assembly 30 may be readily removed from the interior of oven 11, making cleaning and servicing of the oven a simple procedure. Accordingly, the construction disclosed herein not only facilitates servicing of the various mechanical and electrical portions of the oven, but also facilitates cleaning functions necessary to satisfy the various health codes. In the presently preferred embodiment the front panel 21, duct assembly 30 and conveyor assembly 40 may all be removed without the need for any special tools whatsoever the duct and conveyor assemblies are therefore retractably disposed within the oven housing. That is, the duct assembly and conveyor assembly are sized relative to each other and to the housing to be slidably insertable to an operative position within the housing.

Neither the duct assembly nor the conveyor assembly need be connected to the housing top or side walls. As further described herein the drive motor and conveyor drive mechanism for conveyor assembly 40 is disposed external to the oven 11 and thermally isolated from the high temperature conditions within the oven. Thus, electrical and mechanical components which comprise the drive motor and conveyor drive mechanism are not subject to thermal conditions within the oven and may therefore have more extended life cycles and be cheaper to produce. Additionally, the location of the drive motor and conveyor drive mechanism external to the oven 11 further facilitates servicing and cleaning of the interior of the oven 11.

In the presently preferred embodiment drive motor 29 is disposed on the upper surface of housing 13 and is operative to power the drive mechanism at a speed set under direction from control panel 25. One or more heat circulation fans are disposed on the rear of housing 13 and are operative to force air into and about the interior of the oven 11.

Figure 8:
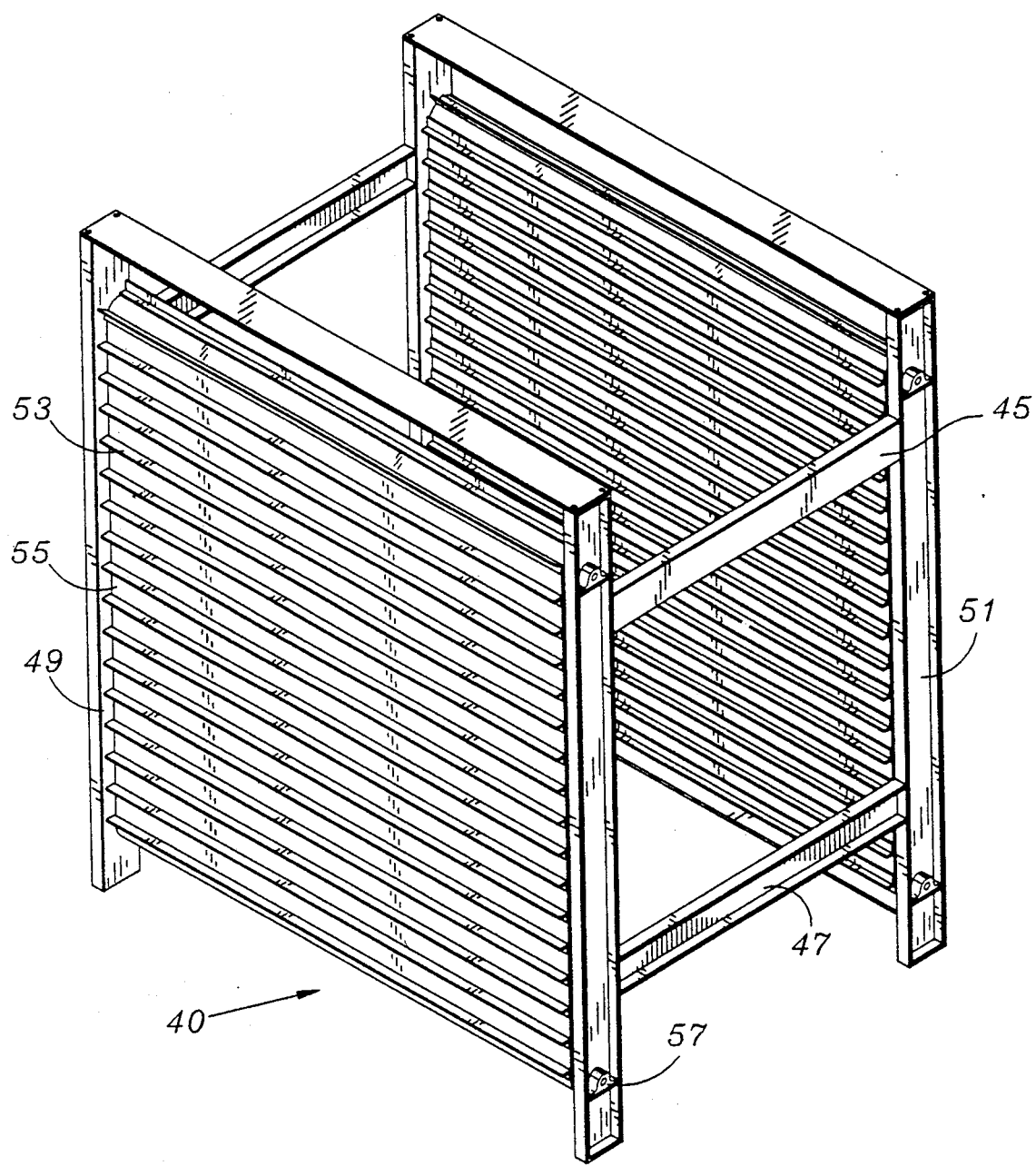
FIG. 8 is an enlarged perspective view of the conveyor assembly shown at FIG. 2.

Referring to FIGS. 2 and 8 it can be seen that the housing 13 incorporates heating elements 27 attached to the sidewalls of the housing. In practice the heating elements can be any of a variety of commercially available devices operative to bring the interior of the oven to the desired temperature range as set at control panel 25.

Duct assembly 30 is preferably formed as a U-shaped body having an open end facing the forward portion of oven 11. Perforations 38 are preferably formed in sidewalls 31, 33 to facilitate the circulation of heated air within oven 11. Heat from the operation of the heater elements 27 is forced through the perforations by the heat circulation fans to provide proper heat distribution. The duct assembly back wall 35 includes one or more openings 37 sized in accordance with the fan mechanisms.

Conveyor assembly 40 is formed to have a pair of vertical frame members 41, 43, connected by a plurality of horizontal cross members such as members 45, 47. The vertical frame members 41, 43 each support substantially symmetrical conveyor mechanisms 49, 51. The conveyor mechanisms 49, 51 comprise conveyor belts 55, each having a plurality of rigid support members 53 extending perpendicularly therefrom. The belts 55 are typically formed of either perforated metal or wire rod lacing which allows heat to pass through the product. The vertical frame members 41, 43 are spaced, and the rigid support members 53 are sized to receive and support removable trays (see FIG. 7) on which the product to be baked is placed. It is anticipated that in some applications the support members may be sized to directly support products placed in the oven without the need for a support tray.

As the belts rotate the trays descend within the oven and are ultimately released as the support members reach the lower portion of the oven. The belts 53 are driven by connecting shafts, e.g. connecting shafts 63, 65, extending through housing 13, duct assembly 30 and connecting to co-axial shafts which directly drive and form a portion of the conveyor mechanisms 49, 51. The connecting shafts 63, 65 may be received and supported by members such as pillow blocks 57 formed in conveyor assembly 40. The pillow blocks 57, similarly formed on the rear side of conveyor assembly 40, may include roller bearing assemblies for facilitating rotation of the connecting shafts and the connected conveyor belt mechanisms.

Figure 6:
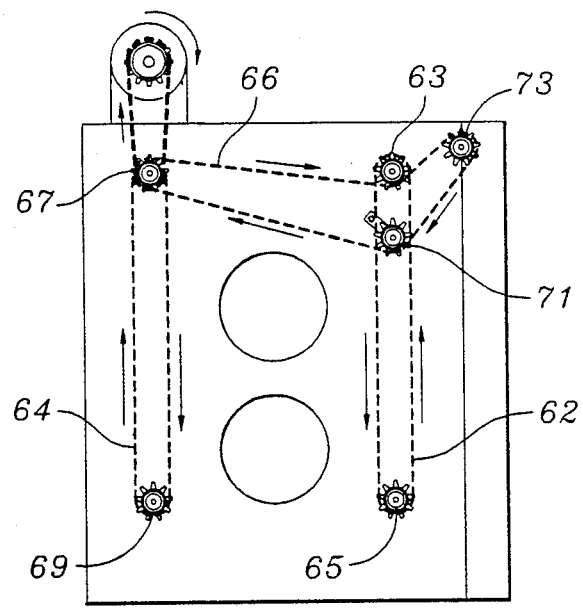
FIG. 6 is a front view of the conveyor drive assembly.

FIG. 3 is a side view of the oven 11 which further illustrates portions of the conveyor belt drive mechanism and heat circulation fan motors. As shown therein drive motor 61 is disposed within drive motor housing 29 and is mechanically linked to shafts 63, 65 via a plurality of interconnected chain belts and sprockets, as shown in more detail at FIGS. 5 and 6. The rotation of drive motor 61 thus causes rotation of connecting shafts 63, 65, 67 and 69 which in turn cause the conveyor belt mechanisms 49, 51 to properly rotate. As shown in more detail at FIG. 6, the rotation of chain belt 62 is synchronized with a rotation of chain belt mechanism 64 by means of chain belt 66 connecting chain belts 62 and 64 via tensioner/idler sprockets 71, 73.

As further shown at FIGS. 3-6, motors for fans 59 may be secured to the oven housing 13. The fans 59 operate to circulate air within the interior of oven 11 to facilitate heating of products descending through the oven 11. As previously indicated the duct assembly 30 may be provided with apertures 37 shaped and sized to accommodate the fans 59. It is to be understood, however, that the fans may alternatively be disposed external to the oven 11 and that the construction of duct assembly apertures 37 may be eliminated or modified in accordance with a particular size and location of the fans 59.

As further shown in FIGS. 3, 4 and 5, the oven may be formed to include a discharge slot formed in the sidewall 12 of oven 11. As also shown at FIG. 2, the sidewall 33 of duct assembly 30 may also be formed to facilitate the discharge of products through discharge slot 17. As shown at FIGS. 4 and 5 a horizontal conveyor mechanism 19 may extend through discharge slot 17 into the oven 11 to receive and transport products after they have descended through the oven 11 and are released from the conveyor belt mechanism. The conveyor belt mechanism 19 may be one of a variety of commonly available horizontal conveyor mechanisms well known to those of ordinary skill in the art. For purposes of clarity the heating elements 27 are not illustrated in FIGS. 4 and 5.

Figure 7:
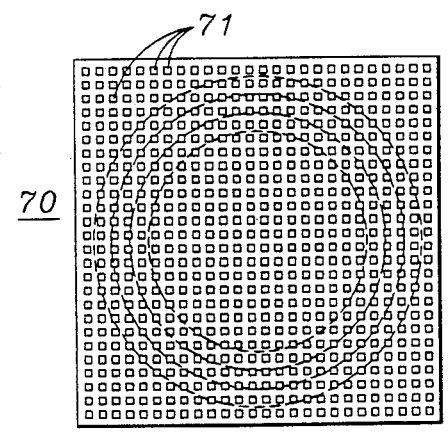
FIG. 7 is a front perspective view of a removable conveyor oven tray.

FIG. 7 illustrates a tray construction for use in conjunction with the oven 11. The exemplary tray 70 may include a plurality of serrations to support products to be baked in oven 11. The tray 70 may also include a plurality of apertures to further facilitate heating of products placed on the tray 70.

As will be understood by a reference to the preceding drawings, the tray 70 may be inserted into oven 11 through loading slot 15, whereupon the tray engages and is supported by a rigid support member 55 from each of the conveyor belt mechanisms 49, 51. As the drive motor 61 rotates the tray 70 descends through the oven 11 until it drops from the rigid support members 53 onto horizontal conveyor mechanism 19, whereupon it is discharged from oven 11 via discharge slot 17.

As will be apparent to one of ordinary skill in the art the tray 70 may be provided with a coating of nonstick organic compound, such as polytetraflouraethylene applied to the contacting surface of the trays.

As will be further apparent from the foregoing discussion, the present invention permits a high rate of production while occupying a minimum floor space footprint. Products need be spaced only by a distance substantially equivalent to their thickness, and the thickness of the supporting plate 70. Thus, at any one time a dozen or more products may be in oven 11 being baked.

What is claimed is:

1. A conveyorized oven for heating products as they traverse vertically within the oven comprising:
    an oven housing having an open front end, sidewalls and a rear wall;
    at least one heat circulation fan secured to the housing for circulating air within the oven housing;
    at least one heater element disposed within said oven housing;
    a duct assembly retractably disposed within said housing for distributing heat from said heater elements;
    a conveyor assembly retractably disposed within said oven housing and said duct assembly for receiving and vertically transporting products to be baked within the oven housing; and
    a conveyor assembly drive mechanism disposed external to said housing for imparting motion to said conveyor assembly.

2. The oven as recited in claim 1 wherein said conveyor assembly drive mechanism is thermally isolated from the interior of the oven.

3. The oven as recited in claim 1 wherein the conveyor assembly comprises first and second horizontally spaced conveyor mechanisms, said first and second horizontally spaced conveyor mechanisms being synchronized to support opposite ends of the product being vertically transported within the oven.

4. The oven as recited in claim 3 wherein each of said first and second conveyor mechanisms have a plurality of support members secured to the surface thereof, said support members being formed to receive and support products vertically traversing within the oven.

5. The oven as recited in claim 4 further comprising a plurality of serrated trays each of said trays being supportable by said first and second conveyor mechanism support members.

6. The oven as recited in claim 3 further comprising a horizontal conveyor extending into oven housing for receiving products as they are discharged from the conveyor assembly and thereafter horizontally transporting the products out of the oven housing said horizontal conveyor extending beneath the lower most of said support members.

7. The oven as recited in claim 1 further including a connecting member extending intermediate said conveyor assembly drive mechanism and said conveyor assembly for communicating motive force to said conveyor assembly.

8. The oven as recited in claim 7 wherein said connecting member extending through the oven housing and is receivable within the conveyor assembly to directly drive the conveyor assembly.

9. The oven as recited in claim 1 further comprising a plurality of connecting members extending intermediate said drive mechanism and said conveyor assembly.

10. The oven as recited in claim 9 wherein said connecting members form the sole connection between the conveyor assembly and the conveyor assembly drive mechanism.

11. The oven as recited in claim 10 wherein said conveyor assembly is disengageable for said conveyor assembly drive mechanism by sliding the conveyor assembly away from the conveyor assembly drive mechanism until the conveyor assembly no longer receives the connecting members.

12. The oven as recited in claim 1 wherein said heater element is secured to at least one interior surface of the oven housing sidewalls.

13. The oven as recited in claim 1 wherein said duct assembly includes at least one perforated wall for facilitating the distribution of heat within the oven.

14. The oven as recited in claim 1 wherein said conveyor assembly is retractable from said oven without removing said duct assembly.

15. The oven as recited in claim 1 wherein said duct system and conveyor assembly are removable from said housing without removal of said fan or said conveyor assembly drive mechanism.

16. The oven as recited in claim 1 further including variable fan speed control means connected to said fan to regulate, the speed thereof.

17. The oven as recited in claim 1 further comprising drive motor control means for regulating the vertical speed of said conveyor assembly.

18. The oven as recited in claim 1 further comprising heating element control means for regulating the heat generated by said heating elements.

19. The oven as recited in claim 1 wherein the heat circulation fan is mounted on said oven housing rear wall.

20. The oven as recited in claim 1 wherein said conveyor assembly is operative to transport products downwardly within said oven housing.

21. The oven as recited in claim 1 further comprising a horizontal conveyor extending into the oven housing for receiving products as they are discharged from the conveyor assembly and thereafter horizontally transport products out of the oven housing.

22. The oven as recited in claim 1 wherein the conveyor assembly is sized relative to said duct assembly to be slidably insertable within said duct assembly.

23. The oven as recited in claim 22 wherein said duct assembly is sized relative to said oven housing to be slidably insertable within said oven housing.

* * * * *